United States Patent
Nam et al.

(10) Patent No.: US 10,727,996 B2
(45) Date of Patent: Jul. 28, 2020

(54) NULL RESOURCE ELEMENTS FOR DYNAMIC AND BURSTY INTER-CELL INTERFERENCE MEASUREMENT IN NEW RADIO

(71) Applicant: QUALCOMM Incorporated, San Diego, CA (US)

(72) Inventors: Wooseok Nam, San Diego, CA (US); Tao Luo, San Diego, CA (US); Makesh Pravin John Wilson, San Diego, CA (US); Sony Akkarakaran, Poway, CA (US); Kaushik Chakraborty, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/994,917

(22) Filed: May 31, 2018

(65) Prior Publication Data
US 2018/0359069 A1    Dec. 13, 2018

Related U.S. Application Data

(60) Provisional application No. 62/519,116, filed on Jun. 13, 2017.

(51) Int. Cl.
*H04W 4/00* (2018.01)
*H04L 5/00* (2006.01)
(Continued)

(52) U.S. Cl.
CPC ......... *H04L 5/0048* (2013.01); *H04B 17/345* (2015.01); *H04B 17/373* (2015.01);
(Continued)

(58) Field of Classification Search
None
See application file for complete search history.

(56) References Cited

U.S. PATENT DOCUMENTS 9,509,390 B2   11/2016   Kim et al.
9,510,222 B2   11/2016   Yerramalli et al.
(Continued)

FOREIGN PATENT DOCUMENTS

WO    2018044715 A1    3/2018

OTHER PUBLICATIONS

Intel Corporation: "On PT-RS for CP-OFDM," 3GPP Draft; R1-1707366 on PT-RS for CP-OFDM, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051272578, 8 pages, Retrieved from the Internet: URL: http://www.3gpp.org/ftp/Meetings_3GPP_SYNC/RAN1/Docs/ [retrieved on May 14, 2017].

(Continued)

*Primary Examiner* — Zewdu A Beyen
(74) *Attorney, Agent, or Firm* — Loza & Loza, LLP Qualcomm Incorporated

(57) ABSTRACT

Aspects of the present disclosure provide various apparatuses and methods for utilizing null resource elements to facilitate dynamic and bursty inter-cell interference measurements in a wireless network like 5G new radio (NR). A user equipment (UE) is provided with resources and signaling to facilitate bursty interference measurements at demodulation time.

32 Claims, 16 Drawing Sheets

(51) Int. Cl.
  *H04B 17/345* (2015.01)
  *H04B 17/373* (2015.01)
  *H04W 24/10* (2009.01)
  *H04W 24/08* (2009.01)

(52) U.S. Cl.
  CPC .......... *H04L 5/0007* (2013.01); *H04L 5/0073* (2013.01); *H04W 24/10* (2013.01); *H04L 5/0035* (2013.01); *H04L 5/0091* (2013.01); *H04W 24/08* (2013.01)

(56) References Cited

U.S. PATENT DOCUMENTS

| | | | |
|---|---|---|---|
| 9,544,860 B2 | 1/2017 | Laroia et al. | |
| 9,788,316 B2 | 10/2017 | Seo et al. | |
| 9,825,741 B2 | 11/2017 | Tabet et al. | |
| 2013/0176877 A1* | 7/2013 | Sadek | H04W 24/02 370/252 |
| 2015/0249517 A1 | 9/2015 | Seo et al. | |
| 2015/0373694 A1 | 12/2015 | You et al. | |
| 2016/0037363 A1* | 2/2016 | Kairouz | H04W 24/00 370/252 |
| 2016/0164590 A1* | 6/2016 | Noh | H04B 7/0413 370/201 |
| 2018/0199328 A1* | 7/2018 | Sang | H04B 7/0617 |
| 2018/0287759 A1* | 10/2018 | Kundargi | H04L 5/0051 |

OTHER PUBLICATIONS

International Search Report and Written Opinion—PCT/US2018/035747—ISA/EPO—dated Aug. 21, 2018.
LG Electronics: "On DL PT-RS Design," 3GPP Draft; R1-1707616, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051272824, 6 pages, Retrieved from the Internet: URL: http://www.3gpp.org/ftp/Meetings_3GPP_SYNC/RAN1/Docs/ [retrieved on May 14, 2017].
Vivo: "Discussion on PTRS Design,"3GPP Draft; R1-1707248_Discussion on PTRS Design, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051272461, 6 pages, Retrieved from the Internet: URL: http://www.3gpp.org/ftp/Meetings_3GPP_SYNC/RAN1/Docs/ [retrieved on May 14, 2017].
ZTE: "Discussion on RS for Phase Tracking," 3GPP Draft; R1-1707132 Discussion on RS for Phase Tracking, 3rd Generation Partnership Project (3GPP), Mobile Competence Centre; 650, Route Des Lucioles; F-06921 Sophia-Antipolis Cedex; France, vol. RAN WG1, No. Hangzhou; May 14, 2017-May 19, 2017, May 14, 2017, XP051272358, 11 pages, Retrieved from the Internet: URL: http://www.3gpp.org/ftp/Meetings_3GPP_SYNC/RAN1/Docs/ [retrieved on May 14, 2017].

* cited by examiner

Self-Contained Slots

NULL RESOURCE ELEMENTS FOR DYNAMIC AND BURSTY INTER-CELL INTERFERENCE MEASUREMENT IN NEW RADIO

PRIORITY CLAIM

This application claims priority to and the benefit of U.S. provisional patent application No. 62/519,116 filed in the United States Patent and Trademark Office on Jun. 13, 2017, the entire content of which is incorporated herein by reference as if fully set forth below in its entirety and for all applicable purposes.

TECHNICAL FIELD

The technology discussed below relates generally to wireless communication systems, and more particularly, to utilizing null resource elements to facilitate dynamic and bursty inter-cell interference measurements in next generation network like new radio (NR).

INTRODUCTION

As the demand for mobile broadband access continues to increase, research and development continue to advance wireless communication technologies not only to meet the growing demand for mobile broadband access, but to advance and enhance the user experience with mobile communications. New radio access technologies, such as 5G new radio (NR) access technology, promise to make wireless broadband indistinguishable from wireline with fiber-like performance at a significantly lower cost-per-bit.

In NR, however, slot structures are far more flexible than current Long-Term Evolution (LTE) slot structures, which may result in highly dynamic and bursty inter-cell interference conditions. For instance, because NR supports mini-slots and ultra-reliable and low-latency communications (URLLC), short burst transmissions within a regular enhanced mobile broadband (eMBB) slot may occur at arbitrary locations or time. In NR, unscheduled uplink transmissions (i.e., without a grant or grantless) are allowed that can cause bursty interference. Other factors in NR that may contribute to bursty interference include support for adaptive reference signal patterns (e.g., demodulation reference signal (DMRS) patterns may depend on number of antenna ports, delay tolerance, Doppler spread, etc.), and beam-based transmissions (e.g., interference from beam changes, including refinements, between measurement and transmission instances, and interference from dynamic switching among multiple possible beam paired links). Interference may also be caused by dynamic time division duplex (TDD) operation. For example, interference may be caused by the arbitrary location of 1-symbol gap for downlink-uplink (DL-UL) switching, cross-link interference (i.e., UL-to-DL and DL-to-UL), etc. Interference may also be caused by slot/symbol misalignment between neighboring cells, for example, because of asynchronous deployment, having a symbol length much shorter than the propagation delay from neighboring cells, etc.

Scheduling and demodulation performance can be highly dependent on the bursty interference conditions at the actual transmission time. However, current interference measurements (e.g., via a channel state information reference signal (CSI-RS) or an interference measurement resource (IMR)), only provide relatively long-term/large-scale measurements. In a bursty interference environment, interference-aware scheduling based on such long-term or large-scale measurement may converge to an overconservative decision to avoid high block error rates and frequent retransmissions, which generally has an undesirable impact on overall system throughput. Furthermore, although bursty interference can be controlled to some extent by fast scheduling coordination among scheduling entities (e.g., Node Bs or gNode B), such coordination is often costly in processing/time and may not be adequate for ultra low latency applications. Accordingly, it would be desirable to provide techniques for bursty and highly dynamic interference measurements in NR that are both reliable and efficient.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication operable at a scheduled entity. The scheduled entity receives a downlink communication including a plurality of null resource elements embedded within a set of resource elements allocated for a reference signal. The scheduled entity demodulates the downlink communication, and performs a plurality of null-based interference measurements on the downlink communication during demodulation of the downlink communication. The plurality of null-based interference measurements are based on the plurality of null resource elements embedded within the resource elements allocated for the reference signal.

Another aspect of the present disclosure provides a wireless communication device. The device includes a processor, a memory communicatively coupled to the processor, and a transceiver communicatively coupled to the processor. The processor and the memory are configured to perform wireless communication. The processor is configured to receive a downlink communication including a plurality of null resource elements embedded within a set of resource elements allocated for a reference signal. The processor is configured to demodulate the downlink communication, and perform a plurality of null-based interference measurements on the downlink communication during demodulation of the downlink communication. The plurality of null-based interference measurements are based on the plurality of null resource elements embedded within the resource elements allocated for the reference signal.

Another aspect of the present disclosure provides a method of wireless communication operable at a scheduling entity. The scheduling entity configures a downlink communication and transmits the downlink communication to a scheduled entity. The scheduling entity embeds null resource elements within a set of resource elements allocated for a reference signal in the downlink communication. The null resource elements facilitate a plurality of null-based interference measurements during demodulation of the downlink communication.

Another aspect of the present disclosure provides a wireless communication device. The device includes a processor, a memory communicatively coupled to the processor, and a transceiver communicatively coupled to the processor. The processor and the memory are configured to perform wireless communication. The processor configures a downlink communication and transmits the downlink communication to a scheduled entity (e.g., user equipment). The processor embeds null resource elements within a set of resource elements allocated for a reference signal in the downlink communication. The null resource elements facilitate a plurality of null-based interference measurements during demodulation of the downlink communication.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
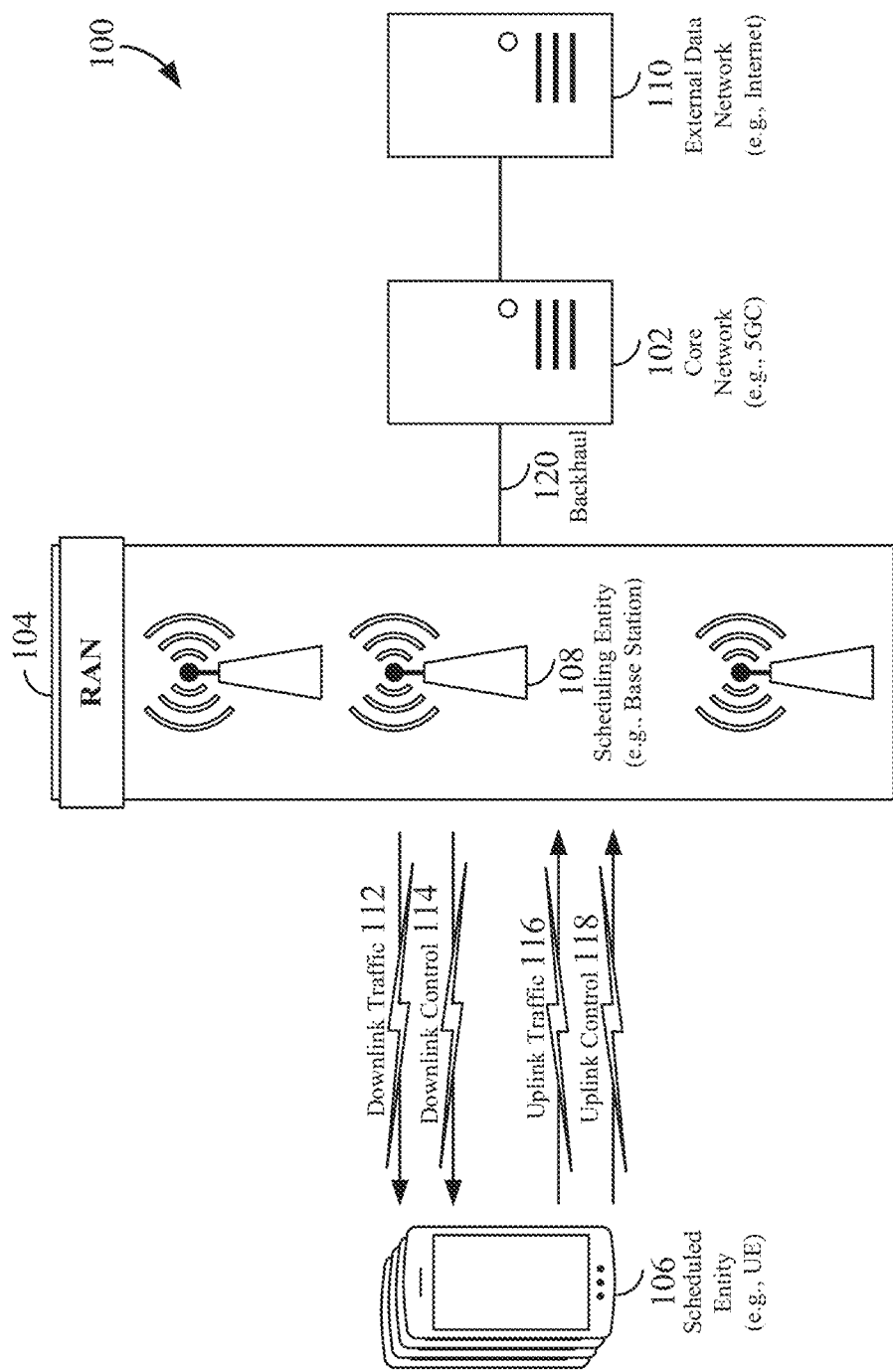
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As will be discussed in more detail herein, the present disclosure includes aspects directed towards utilizing null resource elements to facilitate dynamic and bursty inter-cell interference measurements in a wireless network like 5G new radio (NR). In some examples, a null resource element may be a zero power resource element. In a particular aspect, a user equipment (UE) is provided with resources and signaling to facilitate such interference measurements at demodulation time. Moreover, a null-based on-the-fly interference estimation (Rnn) performed at demodulation time is contemplated, which desirably improves the overall system throughput in interference conditions that are both highly dynamic and bursty. The interference measurement techniques disclosed herein also desirably support symbol-wise and/or subband-wise estimation, as well as data-aided estimation and/or existing/new reference signal-based estimation. For these interference measurement techniques, it is further contemplated that the measurement resources may be embedded within resource blocks scheduled for a particular UE. Timeline issues for low-latency applications are also addressed by providing fast and timely measurement with minimal effort.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

mmWave: millimeter-wave. Generally refers to high bands above 24 GHz, which can provide a very large bandwidth.

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

In single-user MIMO, the transmitter sends one or more streams to the same receiver, taking advantage of capacity gains associated with using multiple Tx, Rx antennas in rich scattering environments where channel variations can be tracked.

The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy.

The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

eMBB: enhanced mobile broadband. Generally, eMBB refers to the continued progression of improvements to existing broadband wireless communication technologies such as LTE. eMBB provides for (generally continuous) increases in data rates and increased network capacity.

URLLC: ultra-reliable and low-latency communication. Sometimes equivalently called mission-critical communication. Reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (for comparison, a target for eMBB may be 4 ms).

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), transmit receive point (TRP), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface or RAT. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
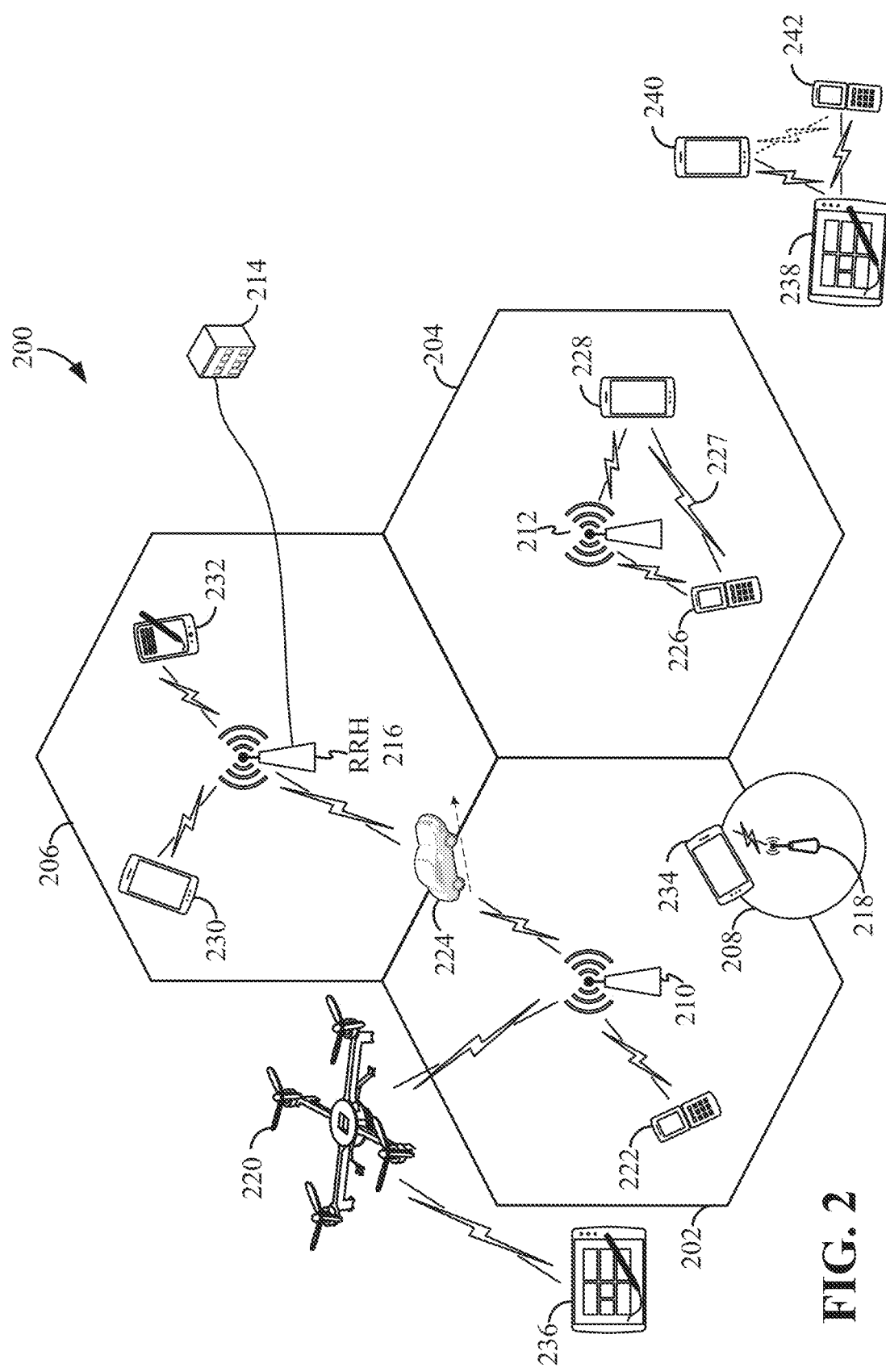
FIG. 2 is a conceptual illustration of an example of a radio access network.

FIG. 2 is a conceptual illustration of an example of a radio access network. By way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. Due to the flexible slot structures and dynamic traffic types in NR, dynamic and bursty inter-cell interference conditions may occur among the base stations and UEs.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
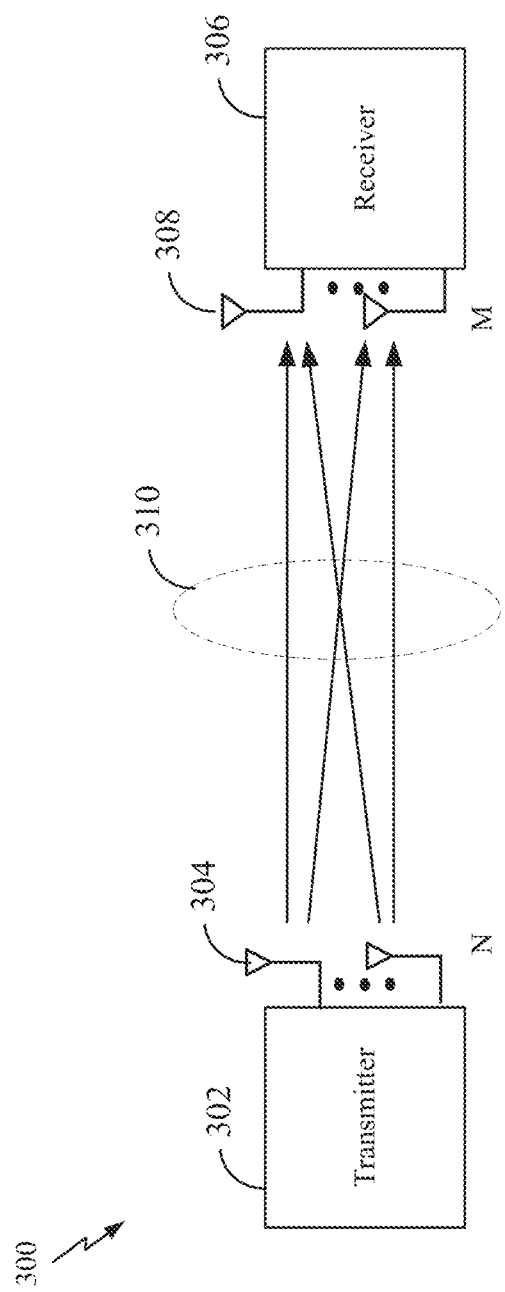
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the information reference signal (CSI-RS) with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Various aspects of the present disclosure will be described with reference to an OFUM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFUM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of, for example, 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port or layer. That is, in a MIMO implementation with multiple antenna ports or layers available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers or tones in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example. In some examples, an RB may extend over multiple symbols (i.e., 2 or more symbols).

Each subframe may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
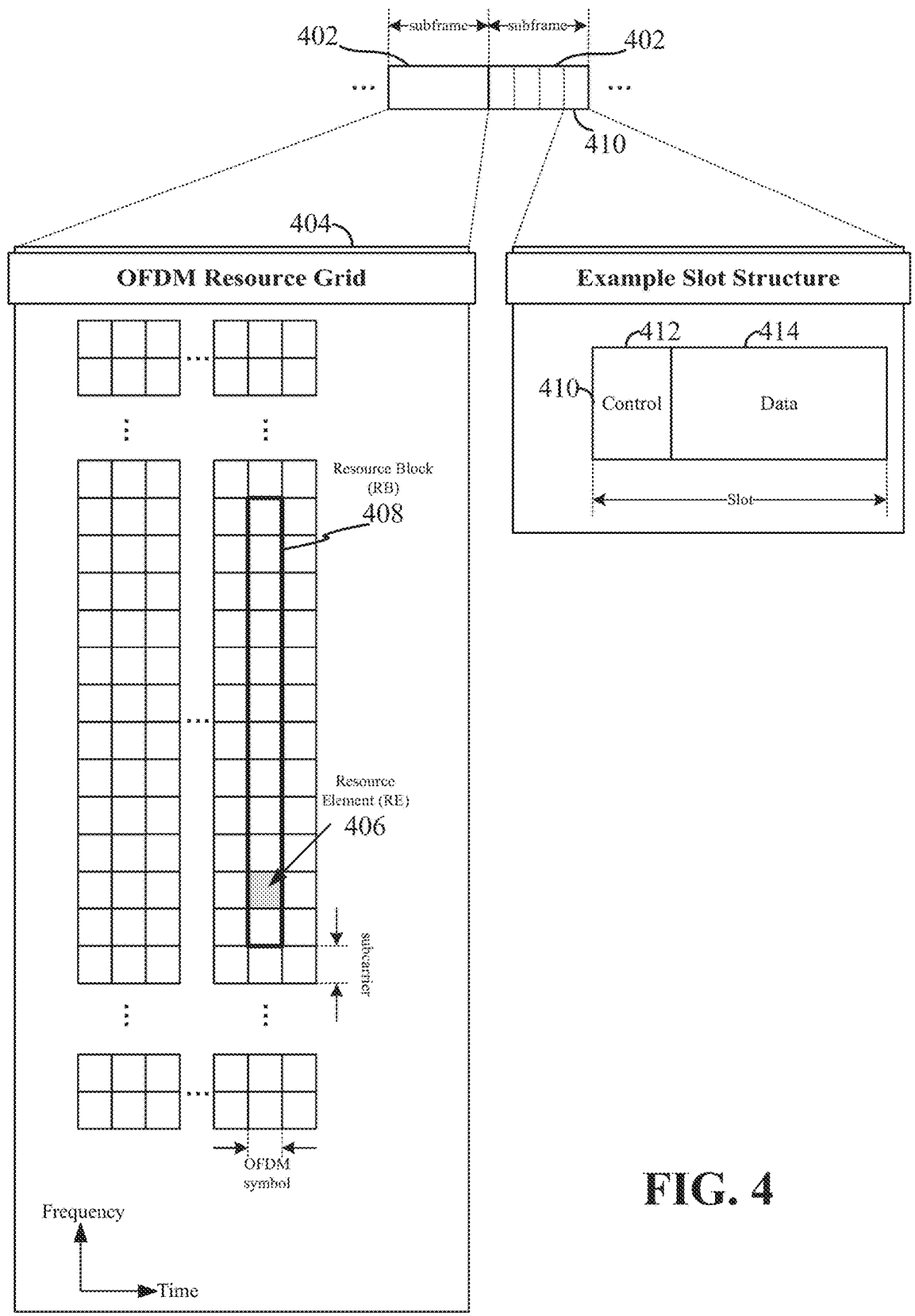
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), a sounding reference signal (SRS), a time-frequency tracking reference signal, and/or a phase tracking reference signal (PTRS). These pilots or reference signals may provide for a receiving device to perform channel estimation and/or interference measurements of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information (DCI) 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
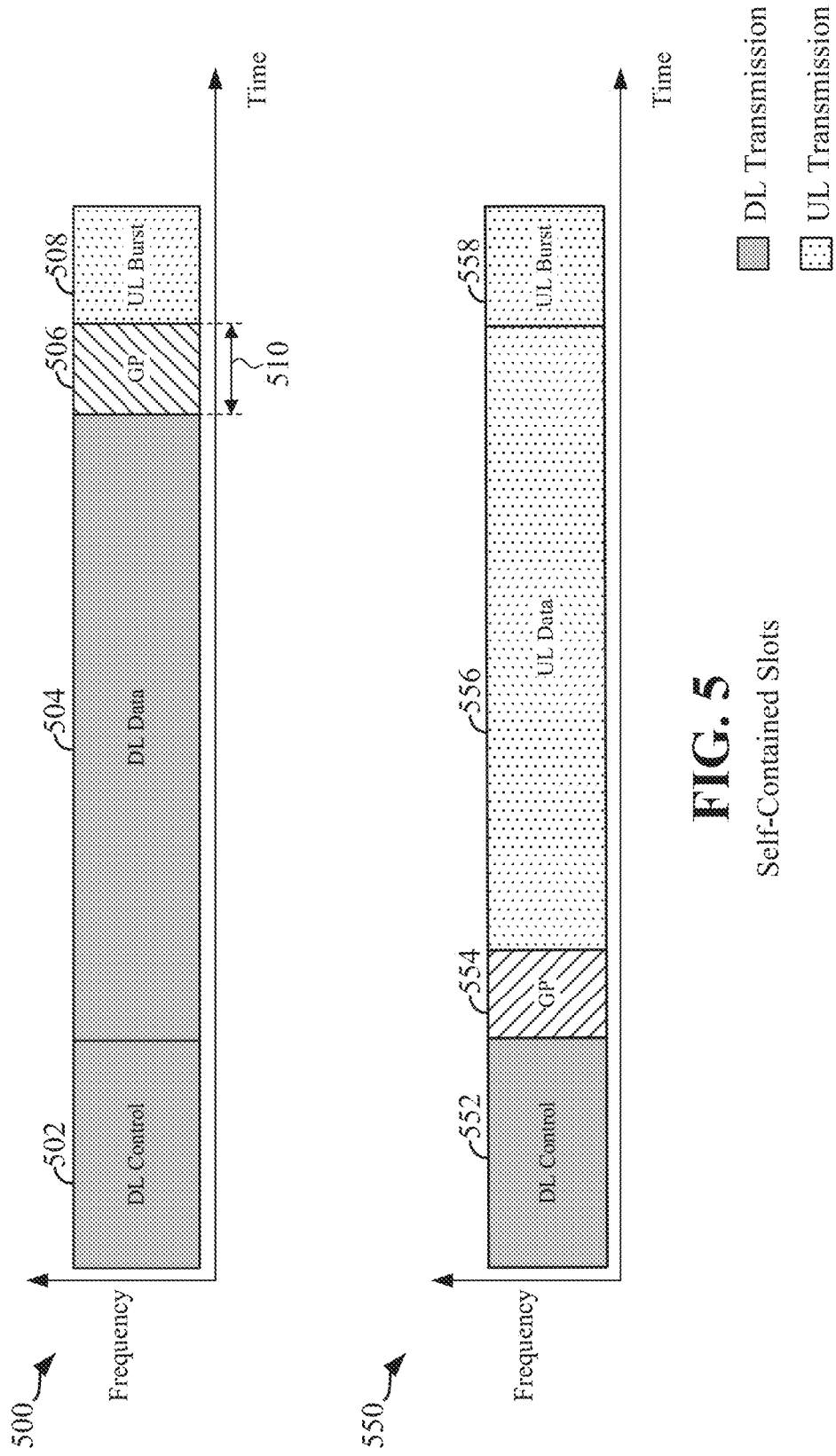
FIG. 5 is a schematic illustration of exemplary self-contained slots according to some aspects of the disclosure.

According to an aspect of the disclosure, one or more slots may be structured as self-contained slots. For example, FIG. 5 illustrates two example structures of self-contained slots 500 and 550. Here, the slots 500 and 550 may correspond to the slot 402 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 550 may be a receiver-scheduled slot, wherein more resources are allocated for transmissions in the UL direction (e.g., transmissions from the scheduled entity 106 to the scheduling entity 108).

Each slot, such as the self-contained slots 500 and 550, may include transmit (Tx) and receive (Rx) portions. For example, in the DL-centric slot 500, the scheduling entity 108 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration 510, the scheduling entity 108 has an opportunity to receive UL data and/or UL feedback including any UL scheduling requests, CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the scheduled entity 106 to transmit early on the UL to match DL timing. Such early transmission may interfere with symbols received from the scheduling entity 108. Accordingly, the GP region 506 may allow an amount of time after the DL data region 504 to prevent interference, where the GP region 506 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 550 may be configured as a self-contained slot. The UL-centric slot 550 is substantially similar to the DL-centric slot 500, including a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Exemplary Utilization of Null Resource Elements for Interference Measurements

Figure 6:
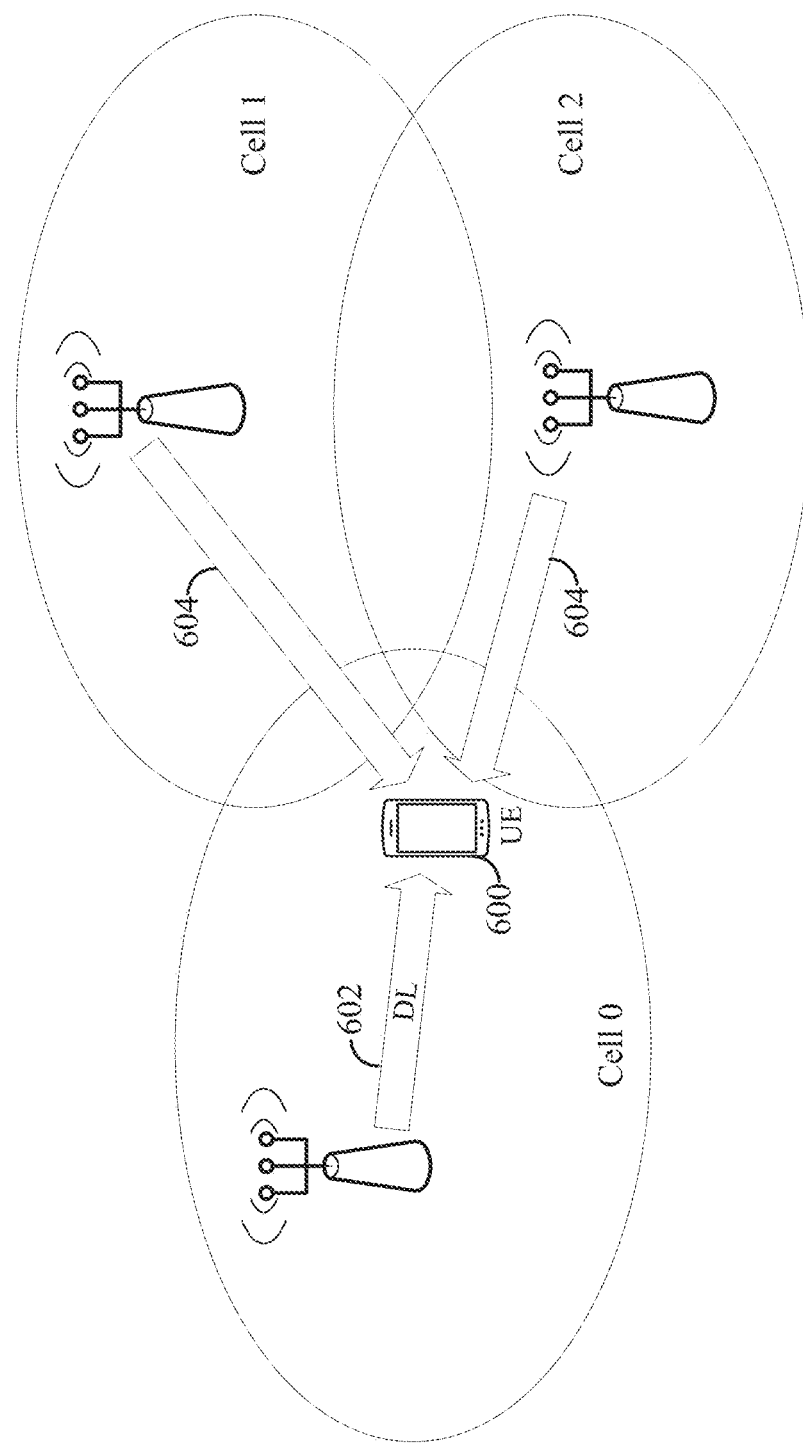
FIG. 6 illustrates an exemplary inter-cell interference environment as discussed according to some aspects of the present disclosure.

As previously discussed, aspects disclosed herein are directed towards utilizing null resource elements to facilitate measurements for dynamic and bursty inter-cell interference in a wireless network like new radio (NR). FIG. 6 illustrates an exemplary inter-cell interference environment in which such aspects may be implemented. As illustrated, a user equipment (UE) 600 camps in Cell 0 and receives a downlink transmission 602, while receiving interference 604 from Cell 1 and/or Cell 2. Due to the dynamic behavior of the neighboring cells, the combined interference power at the UE 600 fluctuates within a slot. Namely, each data symbol (or resource element (RE)) within the downlink transmission of Cell 0 may have its own signal to interference plus noise ratio (SINR), which should be considered during demodulation, for example, in a log likelihood ratio (LLR) calculation for decoding the data carried in the downlink transmission 602.

Figure 7:
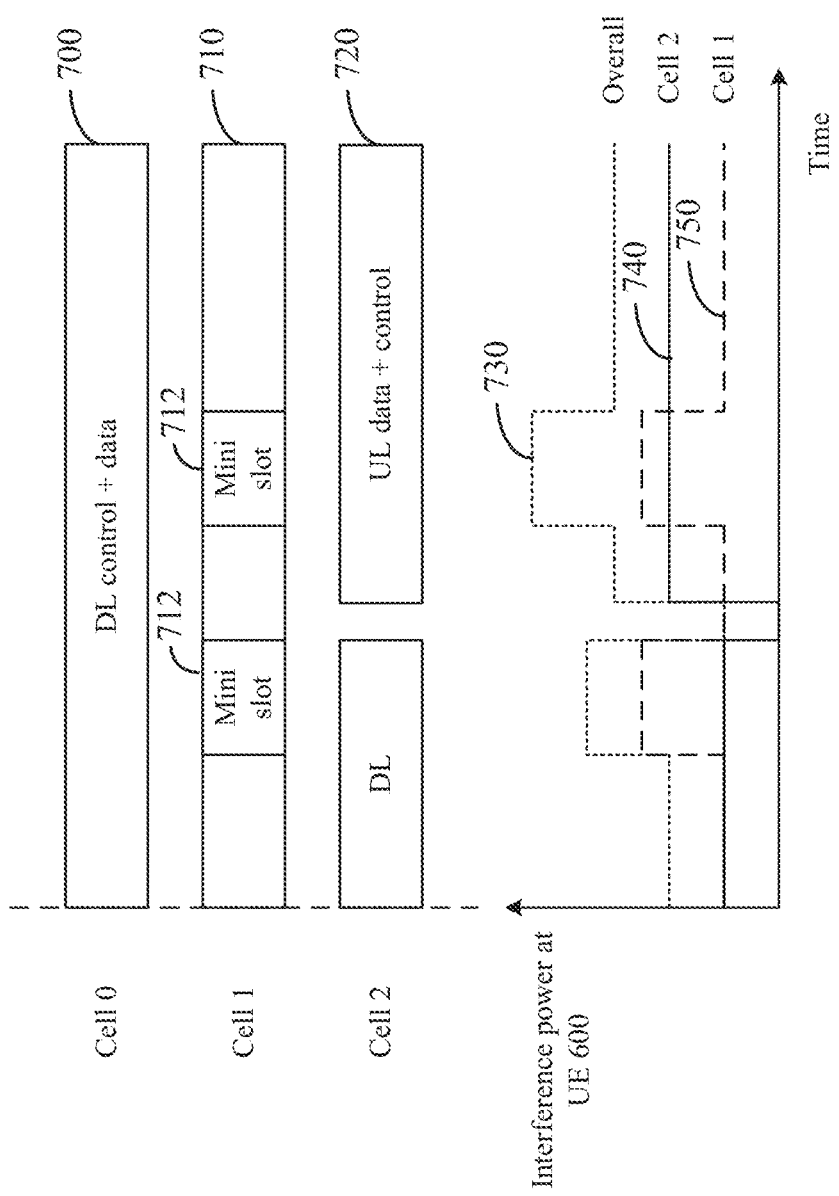
FIG. 7 illustrates exemplary communications and interference powers corresponding to the environment illustrated in FIG. 6.

FIG. 7 illustrates exemplary communications and interference powers corresponding to the environment illustrated in FIG. 6. In first exemplary slot 700, the Cell 0 communication includes downlink (DL) control and data. In a second exemplary slot 710, the Cell 1 communication includes first and second mini slots 712. In a third exemplary slot 720, the Cell 2 communication includes a DL component and an uplink (UL) component. Here, because of the dynamic nature of the communications in its neighboring cells (i.e., Cell1 and Cell 2), the UE 600 in Cell 0 may receive dynamic and bursty interference from the neighboring cells. For example, the UE 600 receives an overall interference power 730, which combines the Cell 1 interference power 740 from the mini-slot transmissions and the Cell 2 interference power 750 from the UL/DL transmissions.

It should be appreciated that various baseline interference measurement approaches have been contemplated. For instance, advantages and disadvantages of a demodulation reference signal (DMRS) based approach have been contemplated. Such DMRS-based approach may estimate an interference ($R_{nn}$) according to:

$$\hat{R}_{nn} = \text{avg}\{(y-\hat{H}x)(y-\hat{H}x)^H\}, x:\text{DMRS sequence}$$

where y is a received signal, where $\hat{H}$ is a channel estimate (e.g., DMRS-based), and where the average { } is taken only over the reference signal (RS) tones. Here, although the relatively low complexity of such approach is desirable, the DMRS time-domain density is typically not high enough to capture symbol-by-symbol interference fluctuations, nor does such DMRS-based approach necessarily measure the interference for data tones during demodulation.

Advantages and disadvantages of a regularization $R_{yy}$-based approach have also been contemplated. Such $R_{yy}$-based approach estimates an interference ($R_{nn}$) according to:

$$\hat{R}_{nn} = \hat{R}_{yy} - \hat{H}\hat{H}^H + \alpha \cdot \text{diag}\{\hat{R}_{yy}\}$$

where $\hat{R}_{yy} = \text{avg}\{yy^H\}$ is an $R_x$ covariance matrix estimate (symbol or subband-wise), and where a is a regularization parameter. Here, although such approach desirably does not require dedicated resources for bursty interference estimations, this approach provides low estimation accuracy for small blocks (e.g., channel estimation error and $R_{yy}$ estimation error).

In an aspect of the present disclosure, a bursty interference measurement (BIM) is contemplated, wherein dedicated resources for on-the-fly interference estimation are provided. It is further contemplated that null or known RS sequences with high density (e.g., high time domain density) can be used, as shown in Table 1 below.

TABLE 1

| Null-Based | Known Sequence-Based |
|---|---|
| $\hat{R}_{nn} = \text{avg}\{yy^H\}$ | $\hat{R}_{nn} = \text{avg}\{(y - \hat{H}x)(y - \hat{H}x)^H\}$, x: known sequence |

For this particular example, the average is taken only over the dedicated resources, and additional regularization may be applied to take the channel estimation error into account and to guarantee positive definiteness. It should be noted that, compared to either of the baseline approaches, the approaches disclosed herein yield a more accurate $R_{nn}$ estimation. Also, approaches disclosed herein preferably utilize BIM resources having a time and/or frequency-domain density high enough to capture the full dynamics or burstiness of the interference (i.e., possible for every symbol).

It should be appreciated that the configuration of BIM resources can depend on any of a plurality of factors. For instance, such factors may include: long-term interference statistics (e.g., measured using an interference measurement resource (IMR)); UE capability, which is a UE-specific assignment (e.g., receiver type MMSE (minimum mean square error), MMSE-IRC (interference rejection combiner), etc.), number of Rx antenna ports, etc.; beam direction, which is a beam-specific assignment; transport block size (e.g., number of assigned resource blocks) or a modulation and coding scheme (MCS) level; uplink/downlink; and frequency range (e.g., mmWave systems would be less impacted by beamforming).

BIM resources may be allocated based on long-term interference statistics, for example, if interference variance is higher than a predetermined threshold (i.e., the UE is operating in a high interference regime). In this case, the UE may achieve signal gain by using BIM. BIM may be used or activated based on UE capability, for example, UEs with advanced receiver types (e.g., MMSE and MMSE-IRC) can use the measured bursty interference to improve performance UEs without interference mitigation capability do not use bursty interference information, and thus do not require BIM resources. In general, a UE with more antennas can spatially suppress interference. However, in practice, it may not be practical to equip a UE with a large number of antennas. In that case, using BIM can provide signal gain. When beamforming is used, some beams may see higher interference than others. In that case, the assignment of BIM resources can be beam-specific. Communication using large transport blocks with higher MCS level is more vulnerable to bursty interference in general because the protection provided by channel coding is weak. In that case, more BIM resources may be needed. An UL receiver (e.g., gNB) may have more antennas and more processing power (e.g., advanced receiver) than a DL receiver (e.g., UE). In that case, BIM resources may be assigned differently for UL and DL communication. In mmWave communication, beamforming allows the communication between a transmitter and receiver to be more directional and aligned, while the direction of interference signal is not aligned. In that case, BIM may not be needed because interference is lower in general in mmWave band.

Various aspects directed towards the triggering of BIMs are also contemplated. For instance, depending on the actual interference condition (i.e., burstiness), it is contemplated that BIM may be triggered on a per-symbol or, at least, per-slot basis. Within such embodiment, a scheduling entity (e.g., a Node B) can predict burstiness of interference (at least for DL) based on backhaul signaling between neighbor cells. Also, both the scheduled entity (e.g., a UE) and the scheduling entity (e.g., a Node B) can measure the burstiness of interference based on code block-wise error events and code block group-based ACK/NACK feedback.

In another aspect of the disclosure, re-using or modifying existing reference signals for BIM is contemplated. When selecting such a reference signal for BIM, however, particular features of the reference signal should be considered. For instance, a DMRS has several undesirable features including, a low time-domain density (e.g., 1 or 2 symbols for front-loaded DMRS+several additional DMRS) and limited flexibility. A CSI-RS might also be considered, but a CSI-RS is undesirably not assigned with scheduled data, and has a density d that may be too low for BIM. For example, one CSI-RS resource element may be scheduled per resource block (RB) (i.e., d=1) or every other RB (even or odd) (i.e., d=0.5).

In some aspects of the disclosure, utilizing a phase tracking reference signal (PTRS) for BIM, however, may be desirable. Indeed, the high time-domain density of PTRS is particularly desirable for BIM (i.e., possibly present in all symbols allocated to data tones), and a PTRS is desirably a UE-specific, MCS and bandwidth dependent assignment. For instance, in new radio (NR) sub-6 (i.e., communication using lower than 6 GHz frequency band), the PTRS for common phase error (CPE) measurement may not be needed. Moreover, since bursty interference is more problematic in low-frequencies, PTRS for CPE measurements in high frequencies can be repackaged or reused for BIM in NR sub-6 applications. In cases where CPE is needed for sub-6 communication, however, PTRS can be used for both CPE measurements and BIM simultaneously. Similarly, for millimeter wave (mmWave) communications, it is contemplated that PTRS can be used for both CPE measurements and BIM.

Several other aspects for utilizing PTRS to facilitate BIM are also considered herein. For instance, PTRS is particularly desirable for supporting punctured and zero-power PTRS. A punctured PTRS includes null resource elements embedded within a portion of resource elements allocated for the PTRS. A zero-power PTRS includes null resource elements embedded in all resource elements allocated for the PTRS. Here, it should also be noted that a null-based BIM can yield an improved timeline and reduced load for Rx processing. To the contrary, non-null BIM requires additional processing. For example, the receiver needs to estimate channel for the PTRS and cancel the PTRS from the received signal so that only interference signal remains. When zero-power PTRS is used, the received signal only contains interference from the beginning and no additional processing is required.

In another aspect for utilizing PTRS to facilitate BIM, it is noted that multiple PTRS configurations may be maintained. For instance, depending on the particular use case, PTRS may be used for only CPE measurements, only BIM, or both CPE and BIM. Also, the density and puncturing pattern of the PTRS can change depending on the applications.

Multiple PTRS configurations may also be supported because of the flexibility of the PTRS tone location. Such flexibility can facilitate capturing interference from the data tone of neighboring cells, for example. A (virtual) Cell-ID-based offset can also be considered. In one example, the PTRS tone can be one of 12 tones within a resource block.

The tone location can be determined as CID mod 12, where CID is the cell ID of the cell.

Depending on the environment (e.g., gNB and UE capability), it should also be noted that PTRS configurations can be established by higher-layer signaling (e.g., RRC signaling), and selected/triggered by downlink control information (DCI). To this end, it is further noted that an implicit indication by the scheduled bandwidth (BW) and MCS may not be sufficient to specify the PTRS configuration.

Null-based interference measurement estimation for multiple-input multiple-output (MIMO) communications is also contemplated. For instance, because a single PTRS port per DMRS port group may not be sufficient, a multi-port PTRS design is contemplated. Some exemplary PTRS configurations are described below in relation to FIGS. 8-11.

Figure 8:
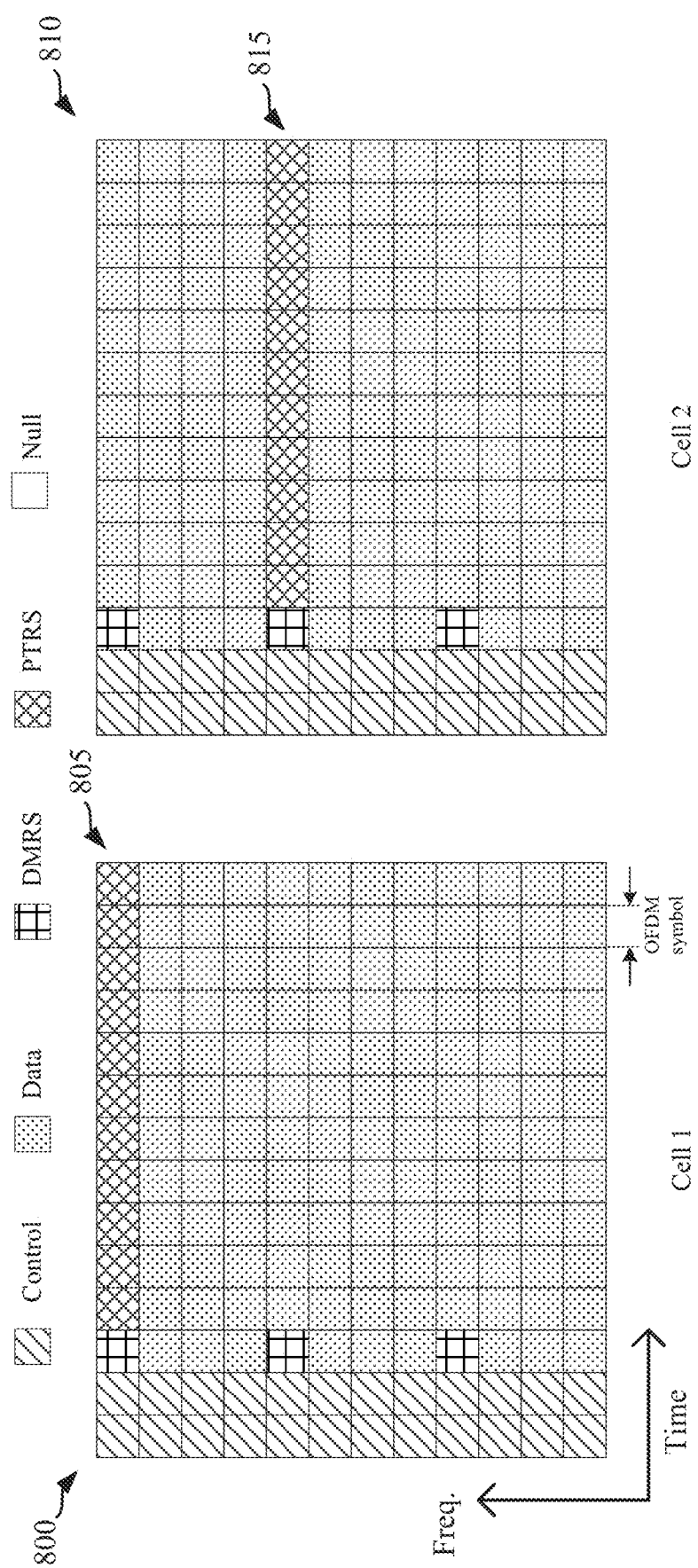
FIG. 8 illustrates exemplary single port phase tracking reference signal (PTRS) configurations according to some aspects of the present disclosure.

FIG. 8 illustrates exemplary single port phase tracking reference signal (PTRS) configurations in accordance with some aspects of the present disclosure. In this figure, the horizontal direction corresponds to the time domain or symbol, and the vertical direction corresponds to the frequency domain or tones. As illustrated, Cell 1 provides a plurality of resource elements (REs) 800 that includes a PTRS 805 on every symbol except those assigned to control information or DMRS, and Cell 2 provides a plurality of REs 810 that includes a PTRS 815 on every symbol except those assigned to control information and DMRS. Here, it is noted that the PTRS tone may collide with data tones of neighboring cells. To overcome this either a punctured PTRS or a zero power PTRS may be configured, as illustrated in FIG. 9.

Figure 9:
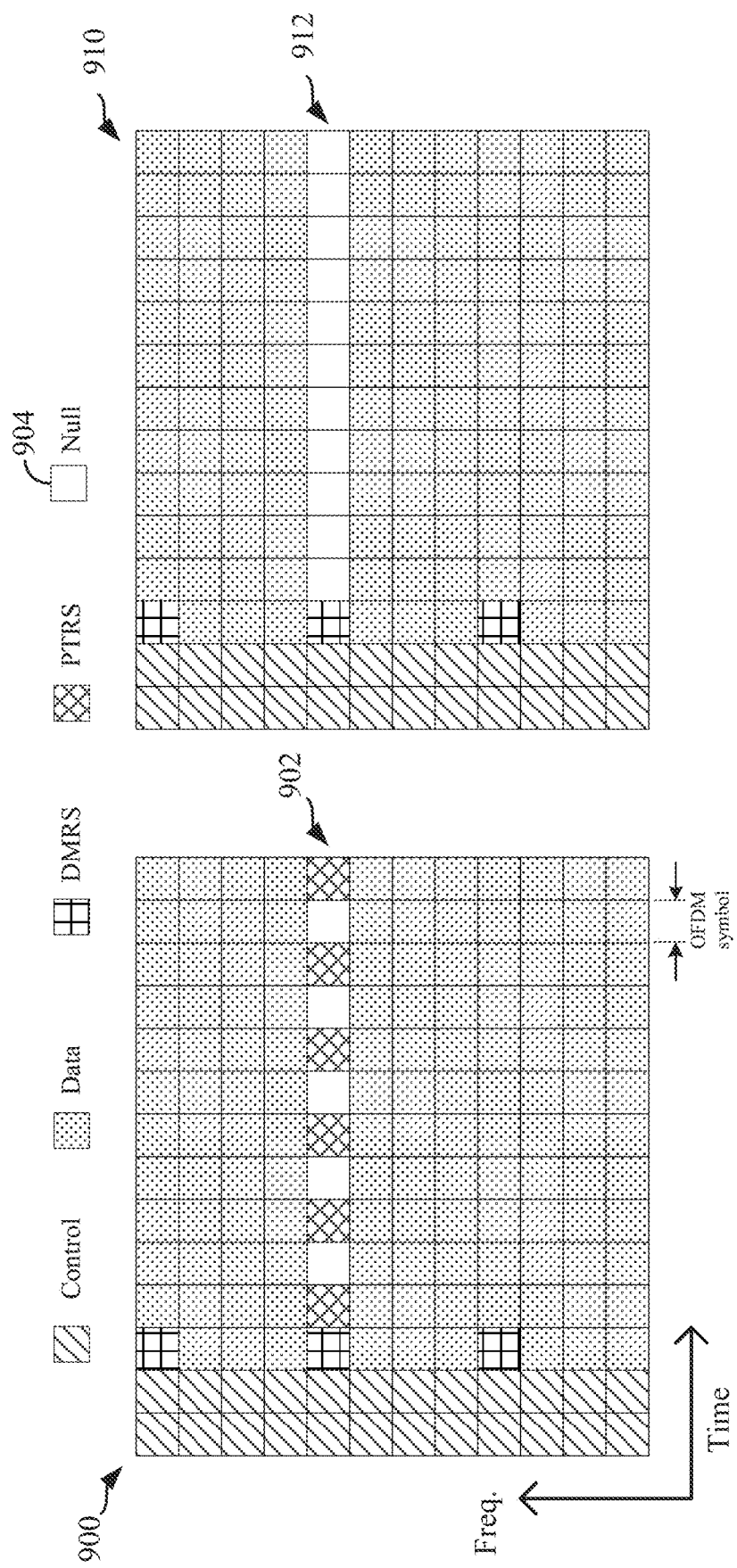
FIG. 9 illustrates an exemplary punctured PTRS and zero power PTRS configurations according to some aspects of the present disclosure.

FIG. 9 illustrates exemplary punctured PTRS and zero power PTRS configurations in accordance with some aspects of the present disclosure. In this figure, the horizontal direction corresponds to the time domain or symbol, and the vertical direction corresponds to the frequency domain or tone. For this particular example, resource elements 900 include a punctured PTRS 902, wherein some of the resource elements allocated for PTRS are replaced with null resource elements 904. In this example, the null resource elements and PTRS resource elements are alternately arranged. FIG. 9 also illustrates resource elements 910 that includes a zero power PTRS 912. Here, all the PTRS resource elements are replaced with null resource elements 904. In both examples, the null resource elements have a high density (e.g., in every two symbols or each symbol) in the time domain.

Figure 10:
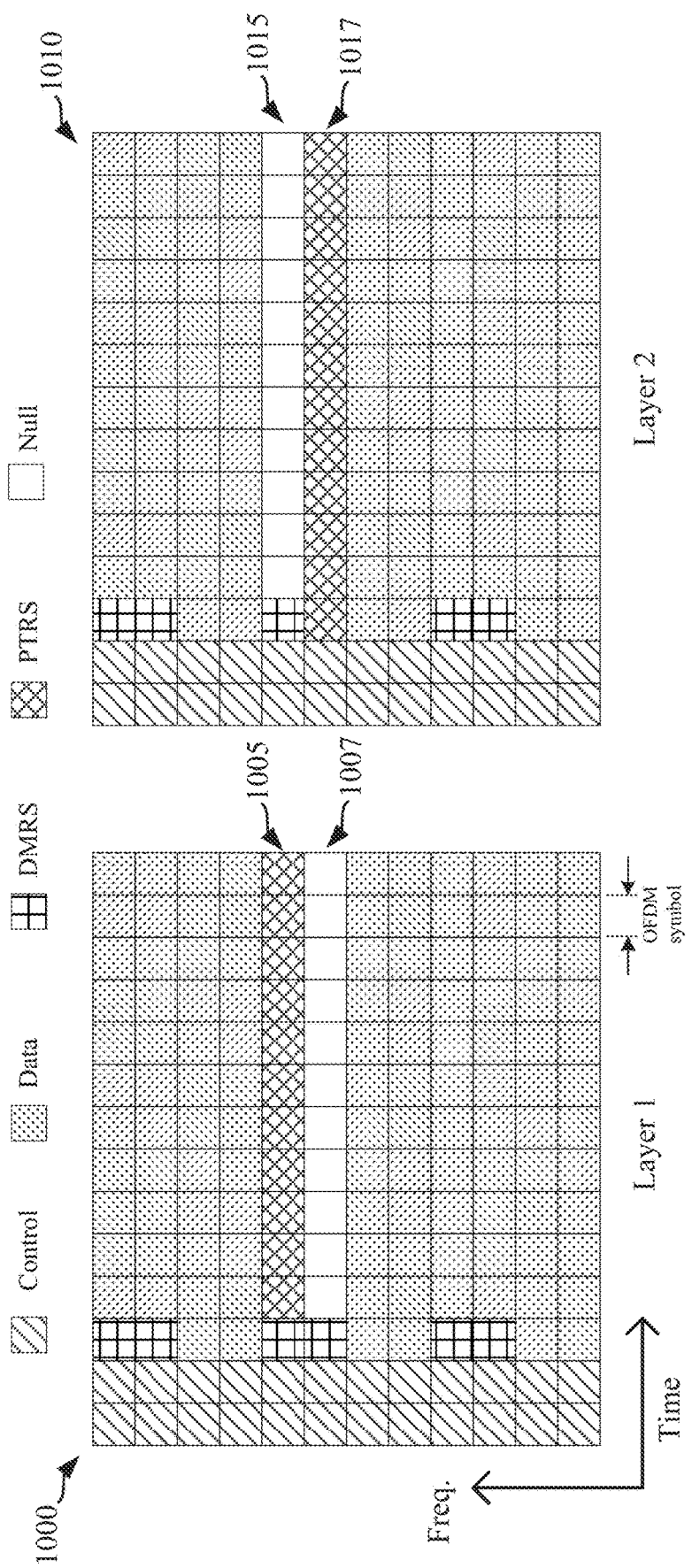
FIG. 10 illustrates exemplary two port PTRS configurations according to some aspects of the present disclosure.

FIG. 10 illustrates exemplary two port PTRS configurations in accordance with some aspects of the present disclosure. In this figure, the horizontal direction corresponds to the time domain or symbol, and the vertical direction corresponds to the frequency domain or tones. As illustrated, REs 1000 corresponding to Layer 1 may include PTRS REs 1005 and null REs 1007, whereas REs 1010 corresponding to Layer 2 may include PTRS REs 1015 and null REs 1017. Here, it is thus noted that two tones or subcarriers are used when multiplexing two non-zero power PTRS ports. In this case, interference measurement may be based on the known sequences.

Figure 11:
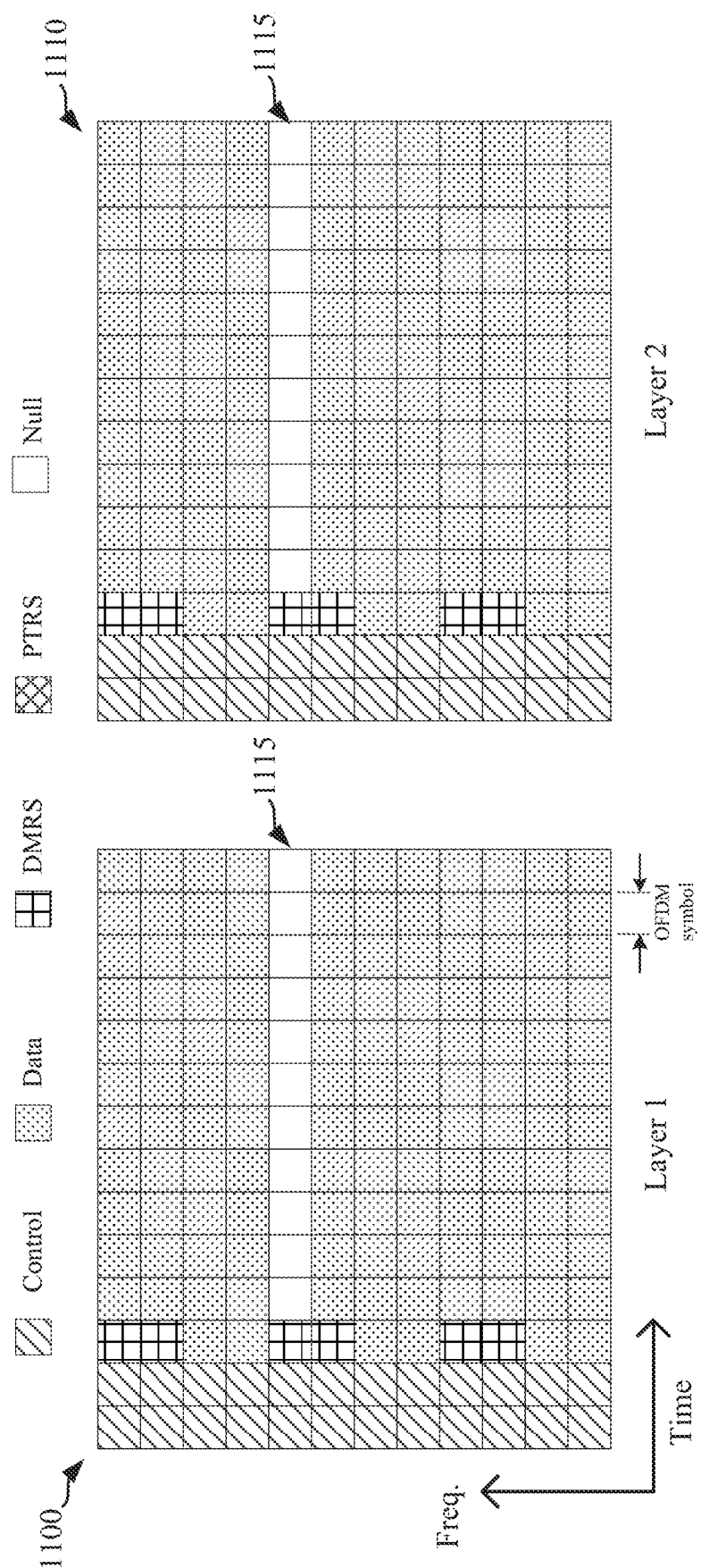
FIG. 11 illustrates an exemplary multiplexing of two zero power PTRS transmissions according to some aspects of the present disclosure.

FIG. 11 illustrates an exemplary multiplexing of two zero power PTRS transmissions in accordance with some aspects of the present disclosure. When multiplexing two zero power PTRS transmissions, however, only one tone or subcarrier may be assigned for $R_{nn}$ estimation, as shown in FIG. 11. As illustrated, REs 1100 corresponding to Layer 1 may include a zero power PTRS 1105, whereas REs 1110 corresponding to Layer 2 may include zero power PTRS 1115.

The above described exemplary PTRS configurations include various features to facilitate BIM and/or CPE. For example, the PTRS configurations support puncturing PTRS and zero-power PTRS. The PTRS configurations also support flexible PTRS subcarrier placement within an RB, explicit signaling of PTRS puncturing patterns, time/frequency densities, subcarrier indices, etc. In some examples, the PTRS configurations can be dynamically signaled via MAC control element or DCI signaling. The PTRS configurations also provide flexible association between multiple PTRS ports and multiple DMRS ports of a DMRS group.

Exemplary PTRS Configuration Signaling

Figure 12:
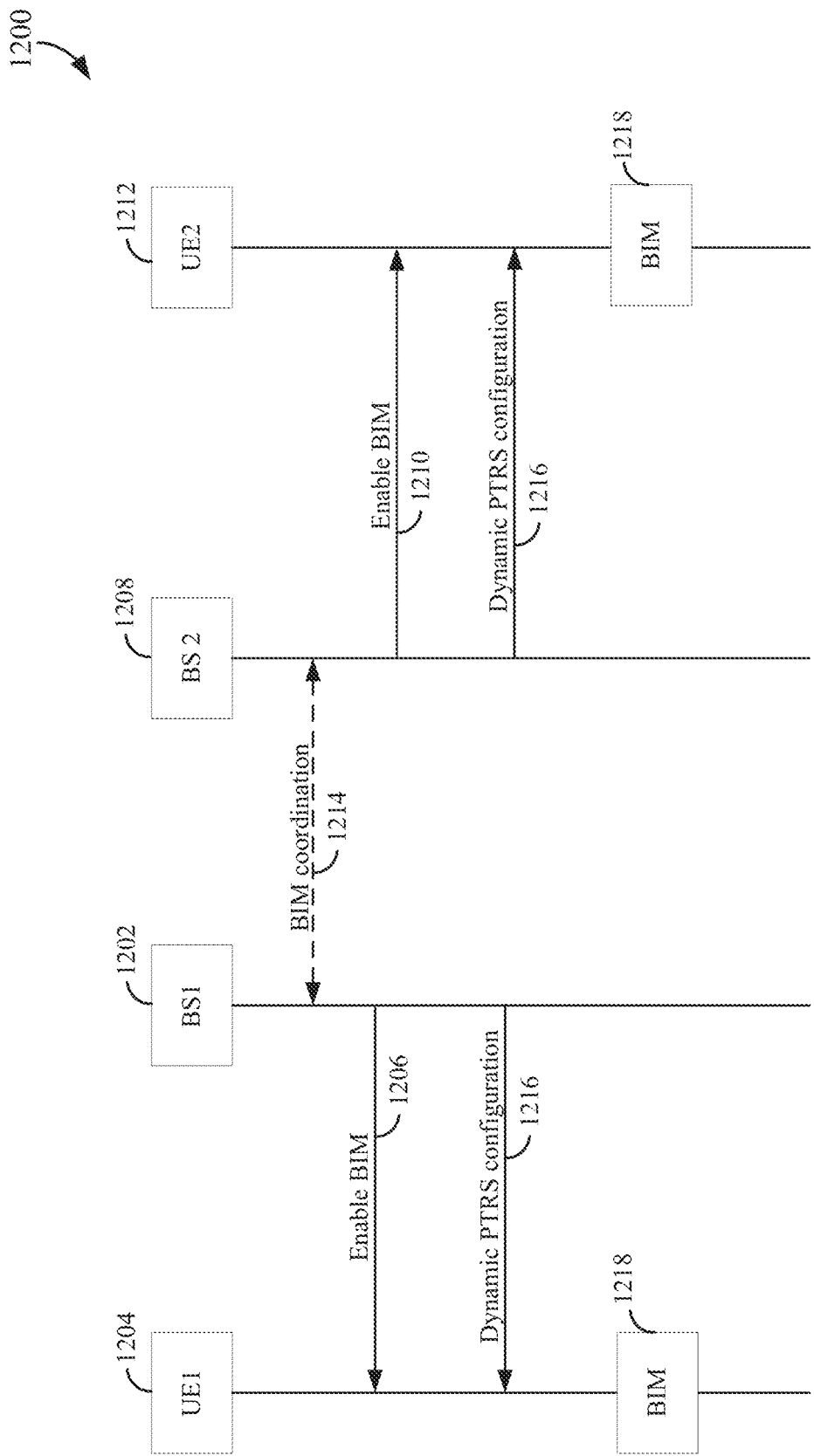
FIG. 12 is a diagram illustrating an exemplary process for signaling PTRS configurations according to some aspects of the present disclosure.

FIG. 12 is a diagram illustrating an exemplary process 1200 for signaling PTRS configurations in BIM in accordance with some aspects of the present disclosure. Scheduling entities (e.g., BS1 or BS2) of neighboring cells can use this process to configure their respective UEs (e.g., UE1 and UE2) to use a certain PTRS configuration that can facilitate BIM. The scheduling entities may be implemented using the scheduling entity 1300 illustrated in FIG. 13, and the UEs may be implemented using the scheduled entity 1500 illustrated in FIG. 15. In some examples, the process 1200 may be carried out by any suitable apparatus or means for carrying out the functions or algorithm described below.

A first scheduling entity 1202 (BS1) may trigger a first UE 1204 (UE1) to perform BIM using PTRS. To that end, BS1 1204 may transmit a radio resource control (RRC) message 1206 to UE1 to indicate the presence of PTRS for BIM. Similarly, in a neighbor cell, a second scheduling entity 1208 (BS2) may transmit an RRC message 1210 to a second UE 1212 (UE2) to indicate the presence of PTRS for BIM. BIM may not be always needed, and hence a scheduling entity may adaptively determine the triggering of BIM based on various factors. For example, the scheduling entity may configure a UE to perform BIM on a per-symbol or, at least, per-slot basis. The scheduling entity may enable BIM depending on the burstiness of interference. For example, the burstiness of interference in upcoming slots may be predicted at the scheduling entities (e.g., BS1 and BS2) through backhaul signaling 1214 between neighboring cells. In some examples, the UEs can detect bursty interference by monitoring code block-wise error events, and report back to their respective scheduling entities for reactive triggering of BIM in subsequent slots.

Once PTRS for BIM is enabled for a certain symbol or slot, the scheduling entities may transmit corresponding PTRS configurations or parameters to their respective UEs, for example, using DCI or other dynamic signaling methods. For example, the PTRS configuration may include the time/frequency allocations of the PTRS, null resource element locations, puncturing patterns, and/or subcarrier indices. Some examples of PTRS configurations are described above in relation to FIGS. 8-11. The scheduling entity (e.g., BS1 and BS2) may configure its UE to use a PTRS configuration that is different from one used in a neighboring cell. Based on the PTRS configurations, the UEs can perform null-based BIM 1218 to determine bursty interference based on the PTRS that contains null resource elements.

In some aspects of the disclosure, once PTRS is configured to be present or enabled, the time/frequency-domain densities may be implicitly determined based on other parameters, such as MCS and scheduled bandwidth (BW). In this case, the scheduling entity does not need to provide further PTRS configuration parameters, for example, in DCI.

Figure 13:
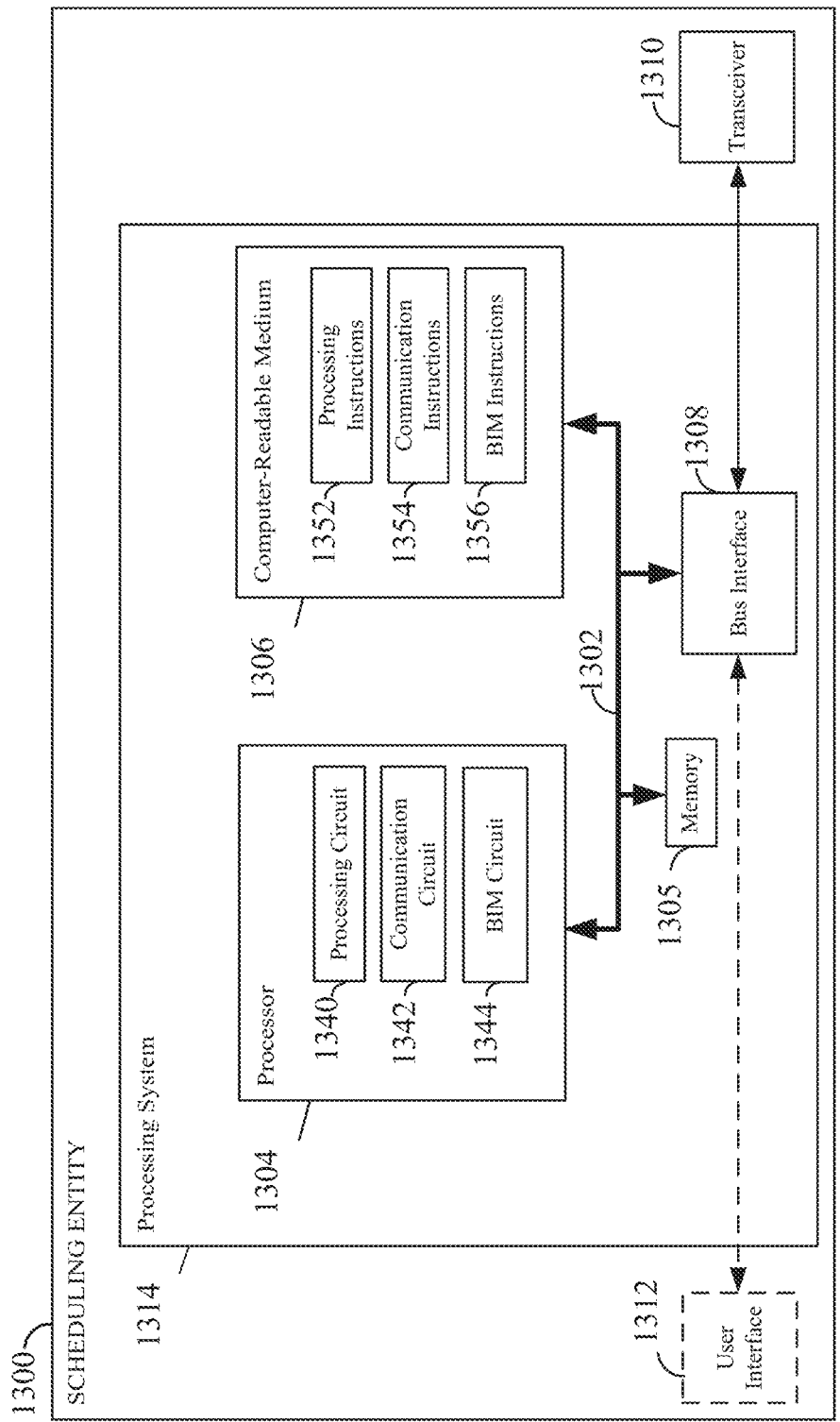
FIG. 13 is a block diagram conceptually illustrating an example of a hardware implementation for a scheduling entity according to some aspects of the disclosure.

FIG. 13 is a block diagram illustrating an example of a hardware implementation for a scheduling entity 1300 employing a processing system 1314. For example, the scheduling entity 1300 may be a user equipment (UE) as illustrated in any one or more of FIGS. 1, 2, 3, 6, and/or 12. In another example, the scheduling entity 1300 may be a base station as illustrated in any one or more of FIGS. 1, 2, 3, 6, and/or 12.

The scheduling entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below and illustrated in FIGS. 8-12, 14, and 16.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include circuitry (e.g., processing circuit 1340, communication circuit 1342, and BIM circuit 1344) configured for various functions, including, for example, null-based BIM and wireless communication functions described in this disclosure. For example, the BIM circuit 1344 may be configured to implement one or more of the functions and processes described below in relation to FIGS. 8-12, 14, and 16.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may include software (e.g., processing instructions 1352, communication instructions 1352, and BIM instructions 1356) configured for various functions, including, for example, null-based BIM functions. For example, the BIM instructions 1356 may be configured to implement one or more of the functions described above in relation to FIGS. 8-12, 14, and 16.

Figure 14:
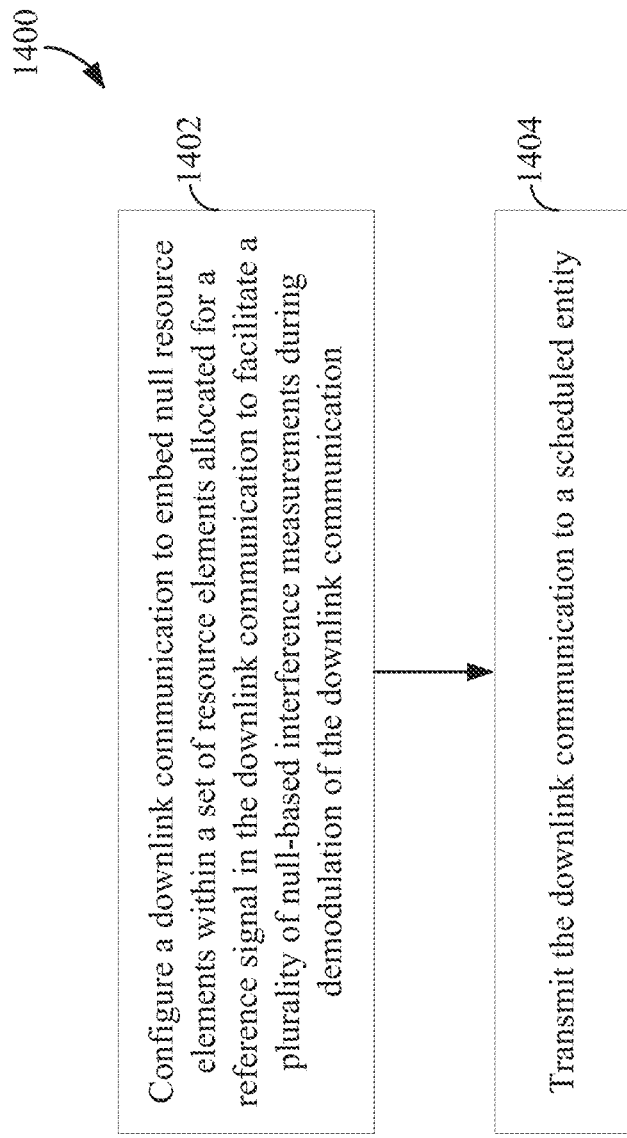
FIG. 14 is a flow chart illustrating an exemplary process for bursty interference management (BIM) according to some aspects of the present disclosure.

FIG. 14 is a flow chart illustrating an exemplary process 1400 for null-based bursty interference management (BIM) in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 1300 illustrated in FIG. 13. In some examples, the process 1400 may be carried out by any suitable apparatus or means for carrying out the functions or algorithm described below.

Referring to FIGS. 13 and 14, at block 1402, the scheduling entity may configure a downlink communication to embed null resource elements in the downlink communication to facilitate a plurality of null-based interference measurements during demodulation of the downlink communication. For example, the scheduling entity may utilize a BIM circuit 1344 to embed null resource elements within a set of resource elements (e.g., REs 406) allocated for a reference signal. The scheduling entity may configure the BIM circuit 1344 using the BIM instructions 1356. At block 1404, the scheduling entity may transmit the configured downlink communication to a scheduled entity (e.g., UE). For example, the scheduling entity may utilize the communication circuit 1342 to transmit the downlink communication to a scheduled entity.

It should be appreciated that various other aspects of process 1400 are also contemplated. For instance, the reference signal may be a phase tracking reference signal (PTRS) that may be a punctured PTRS or a zero power PTRS (see FIG. 9 for example). For a punctured PTRS, it is thus contemplated that the configuring performed at block 1402 may include configuring a punctured PTRS, which includes null resource elements within a portion of resource elements allocated for the PTRS (see e.g., punctured PTRS 902 in FIG. 9). For a zero power PTRS, however, the configuring performed at block 1402 may include configuring a zero power PTRS, which includes null resource elements in all resource elements allocated for the PTRS (see e.g., zero power PTRS 912 in FIG. 9).

In another aspect of the disclosure, it is contemplated that the configuring performed at block 1402 may include embedding null resource elements within a PTRS configured for a common phase error (CPE) estimate. For instance, when the downlink communication is a New Radio (NR) sub-6 communication, the configuring performed at block 1402 may include configuring the PTRS to facilitate the plurality of null-based interference measurements instead of a CPE estimate (i.e., because PTRS may not be needed for CPE measurements in NR sub-6 communication), or configuring the PTRS to facilitate the plurality of null-based interference measurements and the CPE estimate simultaneously (i.e., in cases where CPE is needed for sub-6). When the downlink communication is a millimeter wave (mmWave) communication, the configuring performed at block 1402 may include configuring the PTRS to facilitate both the plurality of null-based interference measurements and a CPE estimate. Any PTRS resources can be used for both BIM and CPE estimation. However, a zero-power PTRS, which is composed of all null tones, is not used for CPE estimate.

Figure 15:
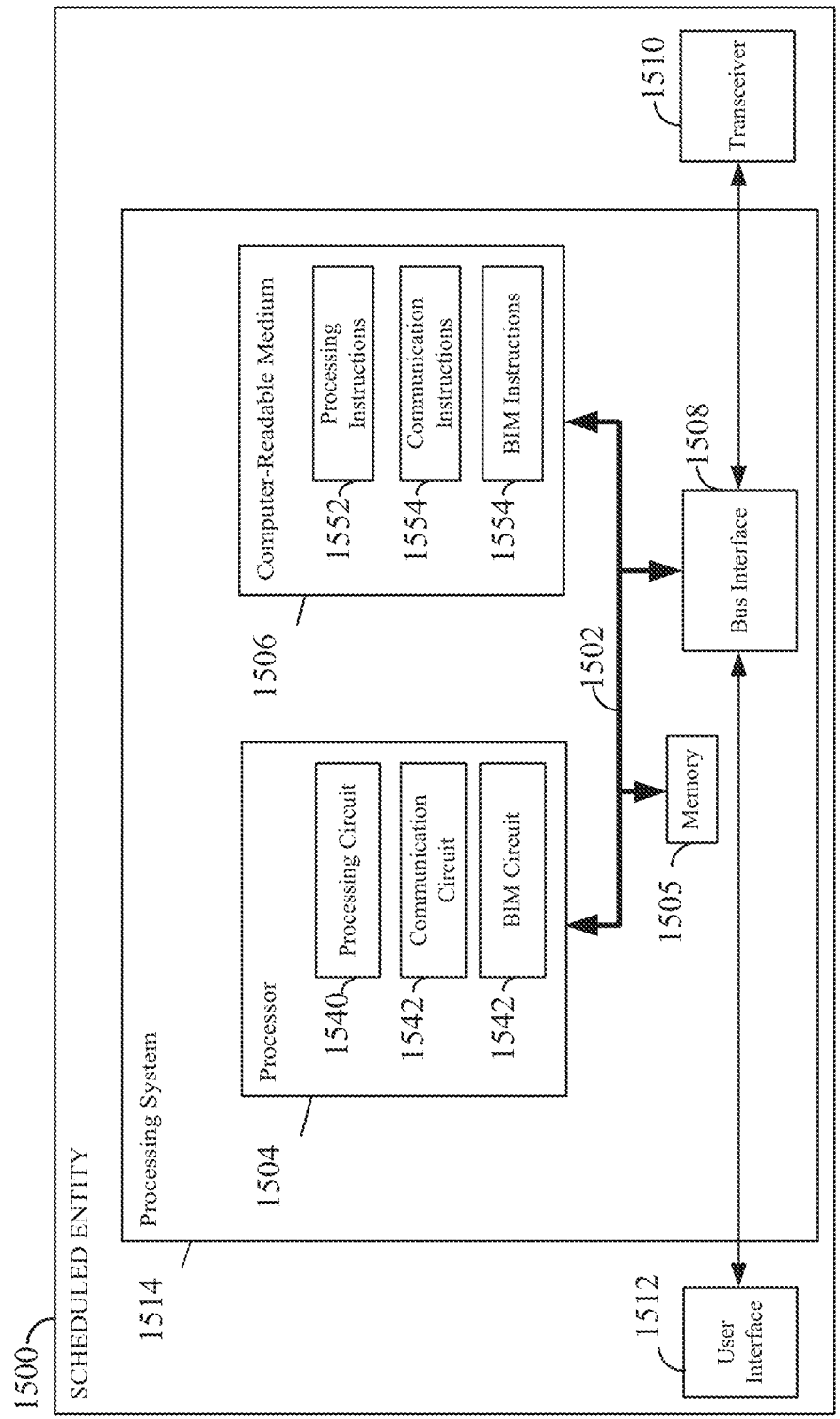
FIG. 15 is a block diagram conceptually illustrating an example of a hardware implementation for a scheduled entity according to some aspects of the disclosure.

FIG. 15 is a conceptual diagram illustrating an example of a hardware implementation for an exemplary scheduled entity 1500 employing a processing system 1514. In accordance with various aspects of the disclosure, an element, or any portion of an element, or any combination of elements may be implemented with a processing system 1514 that includes one or more processors 1504. For example, the scheduled entity 1500 may be a user equipment (UE) as illustrated in any one or more of FIGS. 1, 2, 3, 6, and/or 12.

The processing system 1514 may be substantially the same as the processing system 1314 illustrated in FIG. 13, including a bus interface 1508, a bus 1502, memory 1505, a processor 1504, and a computer-readable medium 1506. Furthermore, the scheduled entity 1500 may include a user interface 1512 and a transceiver 1510 (a communication interface) substantially similar to those described above in FIG. 13. That is, the processor 1504, as utilized in a scheduled entity 1500, may be used to implement any one or more of the processes described and illustrated in relation to FIGS. 8-12 and 16.

In some aspects of the disclosure, the processor 1504 may include circuitry (e.g., processing circuit 1540, communication circuit 1542, and BIM circuit 1542) configured for various functions, including, for example, null-based BIM functions. In one or more examples, the computer-readable storage medium 1506 may include software (e.g., processing instructions 1552, communication instructions 1542, and BIM instructions 1556) configured for various functions, including, for example, BIM functions. For example, the BIM circuit 1542 may be configured by the BIM instructions 1556 to implement one or more of the functions described below in relation to FIG. 16.

Figure 16:
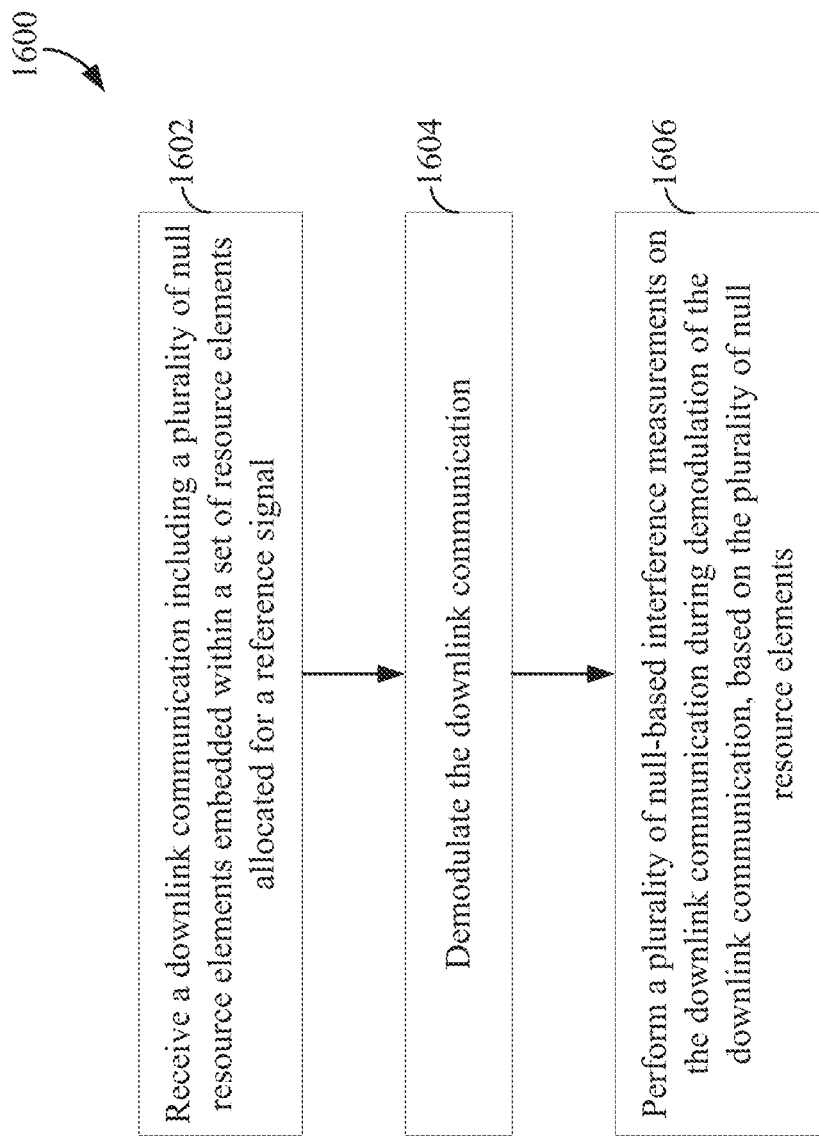
FIG. 16 is a flow chart illustrating an exemplary process for BIM in accordance with some aspects of the present disclosure.

FIG. 16 is a flow chart illustrating an exemplary process 1600 for null-based bursty interference management (BIM) in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity 1500 illustrated in FIG. 15. In some examples, the process 1600 may be carried out by any suitable apparatus or means for carrying out the functions or algorithm described below.

Referring to FIGS. 15 and 16, at block 1602, the scheduled entity receives a downlink communication. For example, the scheduled entity can utilize a communication circuit 1542 to receive a downlink communication including a plurality of null resource elements embedded within a set of resource elements allocated for a reference signal. At block 1604, the scheduled entity demodulates the downlink communication. For example, the scheduled entity may use the communication circuit 1542 to demodulate the downlink communication.

With reference to block 1606, the scheduled entity performs null-based interference measurements on the downlink communication during demodulation of the downlink communication, based on the null resource elements (e.g., null tones) embedded within the downlink communication. Because the null tone assignment is known, the UE can use the received signal on that null tones for interference measurement.

It should be appreciated that various other aspects of the process 1600 are also contemplated. For instance, it should be appreciated that the reference signal may be a phase tracking reference signal (PTRS), and the PTRS may be a punctured PTRS or a zero power PTRS. For a punctured PTRS, it is thus contemplated that the performing executed at block 1604 may include performing the plurality of null-based interference measurements based on a punctured PTRS, which includes null resource elements embedded within a portion of the resource elements allocated for the PTRS (See e.g., punctured PTRS 902 in FIG. 9). For a zero power PTRS, however, the performing executed at block 1604 may include performing the plurality of null-based interference measurements based on a zero power PTRS, which includes null resource elements embedded in all resource elements allocated for the PTRS (See e.g., zero power PTRS 912 in FIG. 9).

In another aspect of the disclosure, it is contemplated that the performing executed at block 1604 may include performing the plurality of null-based interference measurements based on a PTRS configured for a common phase error (CPE) estimate. For instance, when the downlink communication is a New Radio (NR) sub-6 communication, the performing executed at block 1604 may include performing the plurality of null-based interference measurements instead of the CPE estimate (i.e., because PTRS may not be needed for CPE measurements in NR sub-6 communication), or performing both the plurality of null-based interference measurements and the CPE estimate based on the PTRS (i.e., in cases where CPE is needed for sub-6). When the downlink communication is a millimeter wave (mmWave) communication, the performing executed at block 1604 may include performing both the plurality of null-based interference measurements and the CPE estimate based on the PTRS.

In one configuration, the apparatus 1300 and/or 1500 for wireless communication includes means for performing BIM based on null resource elements in a reference signal as described in this specification. In one aspect, the aforementioned means may be the processor(s) 1304/1504 shown in FIG. 13/15 configured to perform the functions recited by the aforementioned means. In another aspect, the aforementioned means may be a circuit or any apparatus configured to perform the functions recited by the aforementioned means.

Of course, in the above examples, the circuitry included in the processor 1304/1504 is merely provided as an example, and other means for carrying out the described functions may be included within various aspects of the present disclosure, including but not limited to the instructions stored in the computer-readable storage medium 1306/1504, or any other suitable apparatus or means described in any one of the FIGS. 1, 2, 3, 6, 12, 13, and/or 15, and utilizing, for example, the processes and/or algorithms described herein in relation to FIGS. 8-12, 14, and 16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, the method comprising:
    reporting bursty interference to a scheduling entity to trigger bursty interference management (BIM);
    receiving, from the scheduling entity, a configuration of a plurality of null resource elements configured for the BIM, the plurality of null resource elements having a time domain density of at least one in every two symbols among at least half of all symbols in a slot;
    receiving a downlink communication comprising the plurality of null resource elements embedded within a set of resource elements allocated for a reference signal;
    demodulating the downlink communication; and
    performing a plurality of null-based interference measurements on the downlink communication during demodulation of the downlink communication,
    wherein the plurality of null-based interference measurements are based on the plurality of null resource elements embedded within the resource elements allocated for the reference signal.

2. The method of claim 1,
    wherein the reference signal comprises a phase tracking reference signal (PTRS), and
    wherein the performing comprises performing the plurality of null-based interference measurements based on the plurality of null resource elements embedded within the resource elements of the PTRS configured for a common phase error (CPE) estimate.

3. The method of claim 1,
wherein the reference signal comprises a phase tracking reference signal (PTRS),
wherein the downlink communication comprises a New Radio (NR) sub-6 communication, and
wherein the performing comprises performing the plurality of null-based interference measurements based on the plurality of null resource elements instead of utilizing the PTRS for a common phase error (CPE) estimate.

4. The method of claim 1,
wherein the reference signal comprises a phase tracking reference signal (PTRS),
wherein the downlink communication comprises a New Radio (NR) sub-6 communication or a millimeter wave (mmWave) communication, and
wherein the performing comprises performing the plurality of null-based interference measurements and a common phase error (CPE) estimate based on the PTRS.

5. The method of claim 1,
wherein the reference signal comprises a punctured phase tracking reference signal (PTRS), and
wherein the performing comprises performing the plurality of null-based interference measurements based on the punctured PTRS received in the downlink communication, the punctured PTRS comprising the null resource elements embedded within a portion of resource elements allocated for the punctured PTRS.

6. The method of claim 1,
wherein the reference signal comprises a zero power phase tracking reference signal (PTRS), and
wherein the performing comprises performing the plurality of null-based interference measurements based on the zero power PTRS received in the downlink communication, the zero power PTRS comprising null resource elements embedded in all resource elements allocated for the zero power PTRS.

7. The method of claim 1,
wherein the scheduled entity comprises a user equipment, and
wherein the scheduling entity comprises a base station.

8. A wireless communication device comprising:
a processor;
a memory communicatively coupled to the processor; and
a transceiver communicatively coupled to the processor, configured to communicate with a scheduling entity,
wherein the processor and the memory are configured to:
report bursty interference to the scheduling entity to trigger bursty interference management (BIM);
receive, from the scheduling entity, a configuration of a plurality of null resource elements configured for the BIM, the plurality of null resource elements having a time domain density of at least one in every two symbols among at least half of all symbols in a slot;
receive a downlink communication comprising the plurality of null resource elements embedded within a set of resource elements allocated for a reference signal;
demodulate the downlink communication; and
perform a plurality of null-based interference measurements on the downlink communication during demodulation of the downlink communication,
wherein the plurality of null-based interference measurements are based on the plurality of null resource elements embedded within the resource elements allocated for the reference signal.

9. The wireless communication device of claim 8,
wherein the reference signal comprises a phase tracking reference signal (PTRS), and
wherein the processor and the memory are further configured to:
perform the plurality of null-based interference measurements based on the plurality of null resource elements embedded within the resource elements of the PTRS configured for a common phase error (CPE) estimate.

10. The wireless communication device of claim 8,
wherein the reference signal comprises a phase tracking reference signal (PTRS),
wherein the downlink communication comprises a New Radio (NR) sub-6 communication, and
wherein the processor and the memory are further configured to:
perform the plurality of null-based interference measurements based on the plurality of null resource elements instead of utilizing the PTRS for a common phase error (CPE) estimate.

11. The wireless communication device of claim 8,
wherein the reference signal comprises a phase tracking reference signal (PTRS),
wherein the downlink communication comprises a New Radio (NR) sub-6 communication or a millimeter wave (mmWave) communication, and
wherein the processor and the memory are further configured to:
perform the plurality of null-based interference measurements and a common phase error (CPE) estimate based on the PTRS.

12. The wireless communication device of claim 8,
wherein the reference signal comprises a punctured phase tracking reference signal (PTRS), and
wherein the processor and the memory are further configured to:
perform the plurality of null-based interference measurements based on the punctured PTRS received in the downlink communication, the punctured PTRS comprising the null resource elements embedded within a portion of resource elements allocated for the punctured PTRS.

13. The wireless communication device of claim 8,
wherein the reference signal comprises a zero power phase tracking reference signal (PTRS), and
wherein the processor and the memory are further configured to:
perform comprises performing the plurality of null-based interference measurements based on the zero power PTRS received in the downlink communication, the zero power PTRS comprising null resource elements embedded in all resource elements allocated for the zero power PTRS.

14. A method of wireless communication operable at a scheduling entity, the method comprising:
triggering bursty interference management (BIM) based on burstiness of interference in an upcoming slot;
configuring a downlink communication to utilize the BIM, the configuring comprising embedding null resource elements within a set of resource elements allocated for a reference signal in the downlink communication, wherein the null resource elements facilitate a plurality of null-based interference measurements during demodulation of the downlink communication;
transmitting, to a scheduled entity, a configuration of the null resource elements configured for the BIM, the null resource elements having a time domain density of at least one in every two symbols or higher among at least half of all symbols in a slot; and transmitting the downlink communication to the scheduled entity.

15. The method of claim 14, wherein the reference signal comprises a phase tracking reference signal (PTRS).

16. The method of claim 15, wherein the configuring comprises embedding the null resource elements within the PTRS configured for a common phase error (CPE) estimate.

17. The method of claim 16, wherein the downlink communication comprises a New Radio (NR) sub-6 communication, and wherein the configuring comprises configuring the PTRS to facilitate the plurality of null-based interference measurements based on the null resource elements instead of the CPE estimate.

18. The method of claim 16, wherein the downlink communication comprises a New Radio (NR) sub-6 communication, and wherein the configuring comprises configuring the PTRS to facilitate the plurality of null-based interference measurements and the CPE estimate.

19. The method of claim 16, wherein the downlink communication comprises a millimeter wave (mmWave) communication, and wherein the configuring comprises configuring the PTRS to facilitate the plurality of null-based interference measurements and the CPE estimate.

20. The method of claim 15, wherein the configuring comprises at least one of:
configuring a punctured PTRS, and wherein the punctured PTRS comprises the null resource elements embedded within a portion of resource elements allocated for the PTRS; or
configuring a zero power PTRS, and wherein the zero power PTRS comprises the null resource elements embedded in all resource elements allocated for the PTRS.

21. The method of claim 14,
wherein the scheduled entity comprises a user equipment, and
wherein the scheduling entity comprises a base station.

22. The method of claim 14, further comprising allocating resources for the BIM based on long-term interference statistics.

23. The method of claim 14, further comprising at least one of:
triggering the BIM on a per-symbol basis; or
triggering the BIM on a per-slot basis.

24. A wireless communication device comprising:
a processor;
a memory communicatively coupled to the processor; and
a transceiver communicatively coupled to the processor, configured to communicate with a scheduled entity,
wherein the processor and the memory are configured to:
trigger bursty interference management (BIM) based on burstiness of interference in an upcoming slot;
configure a downlink communication to utilize the BIM, the configuring comprising embedding null resource elements within a set of resource elements allocated for a reference signal in the downlink communication, wherein the null resource elements facilitate a plurality of null-based interference measurements during demodulation of the downlink communication;
transmit, to the scheduled entity, a configuration of the null resource elements configured for the BIM, the null resource elements having a time domain density of at least one in every two symbols among at least half of all symbols in a slot; and
transmit the downlink communication to the scheduled entity.

25. The wireless communication device of claim 24, wherein the reference signal comprises a phase tracking reference signal (PTRS).

26. The wireless communication device of claim 25, wherein the processor and the memory are further configured to:
embed the null resource elements within the PTRS configured for a common phase error (CPE) estimate.

27. The wireless communication device of claim 26,
wherein the downlink communication comprises a New Radio (NR) sub-6 communication, and
wherein the processor and the memory are further configured to:
configure the PTRS to facilitate the plurality of null-based interference measurements based on the null resource elements instead of the CPE estimate.

28. The wireless communication device of claim 26,
wherein the downlink communication comprises a New Radio (NR) sub-6 communication, and
wherein the processor and the memory are further configured to:
configure the PTRS to facilitate the plurality of null-based interference measurements and the CPE estimate.

29. The wireless communication device of claim 26,
wherein the downlink communication comprises a millimeter wave (mmWave) communication, and
wherein the processor and the memory are further configured to:
configure the PTRS to facilitate the plurality of null-based interference measurements and the CPE estimate.

30. The wireless communication device of claim 25, wherein the processor and the memory are further configured to, at least one of:
configure a punctured PTRS, and wherein the punctured PTRS comprises the null resource elements embedded within a portion of resource elements allocated for the PTRS; or
configure a zero power PTRS, and wherein the zero power PTRS comprises the null resource elements embedded in all resource elements allocated for the PTRS.

31. The wireless communication device of claim 24, wherein the processor and the memory are further configured to allocate resources for the BIM based on long-term interference statistics.

32. The wireless communication device of claim 24, wherein the processor and the memory are further configured to, at least one of:
trigger the BIM on a per-symbol basis; or
trigger the BIM on a per-slot basis.

* * * * *